Patented July 28, 1925.

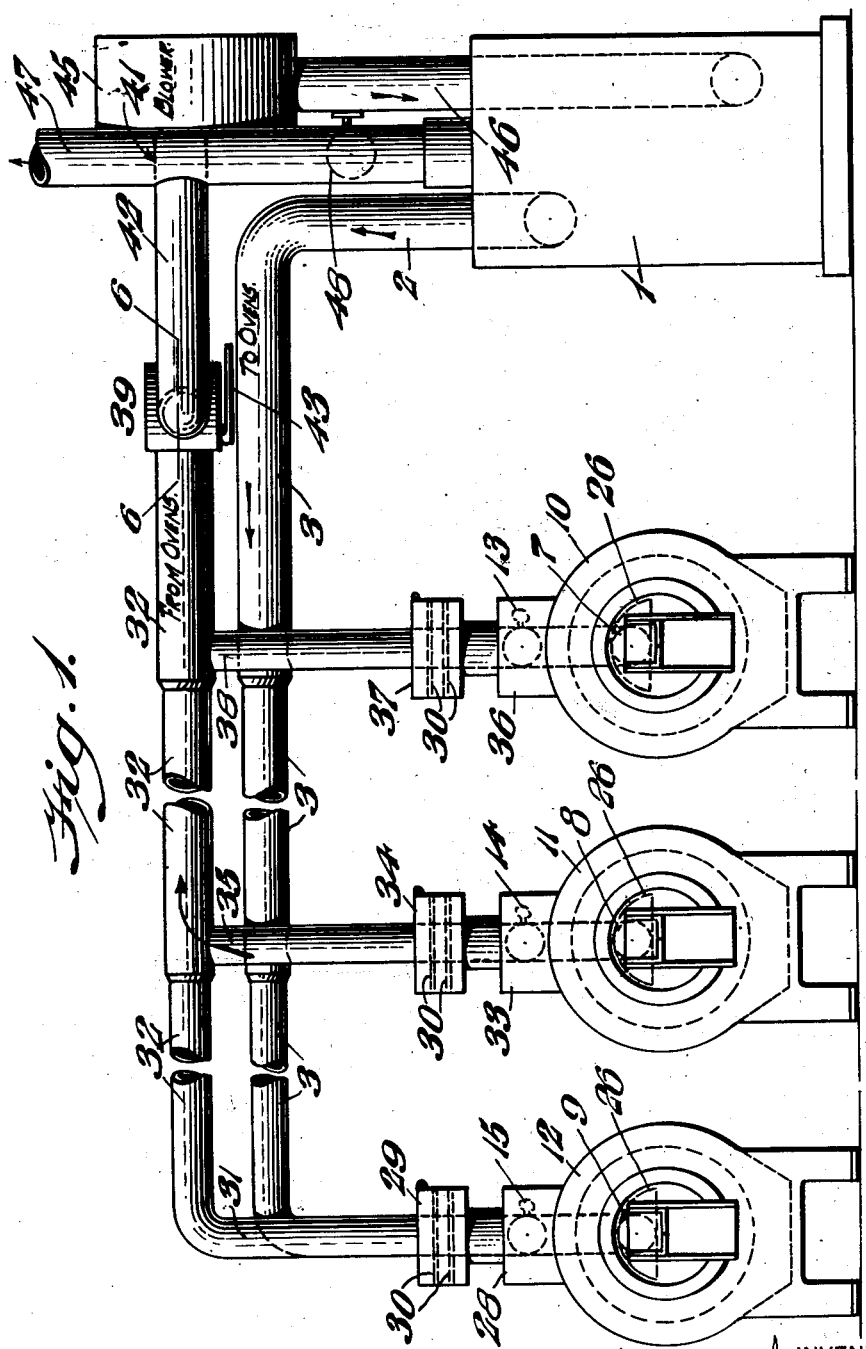

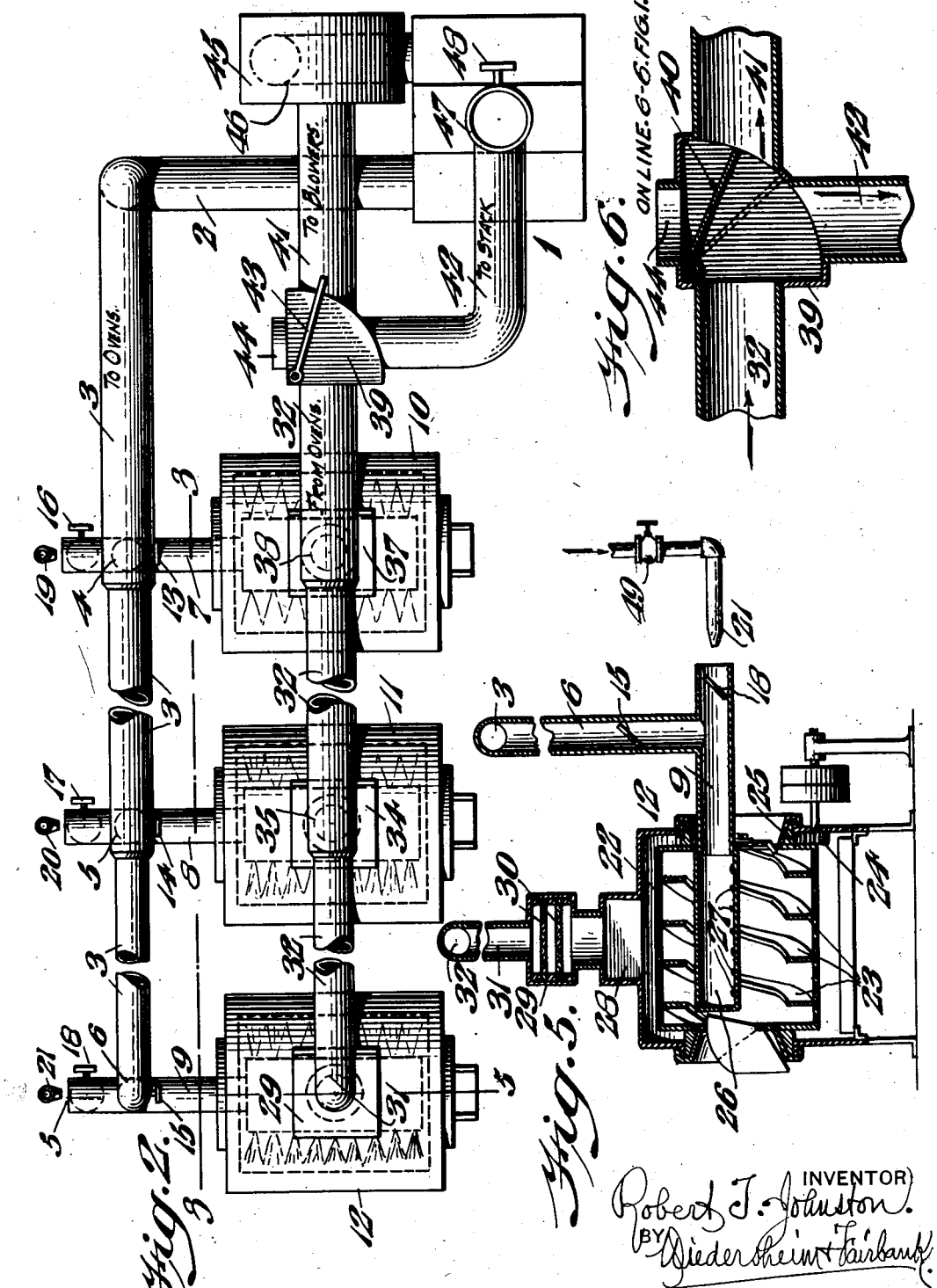

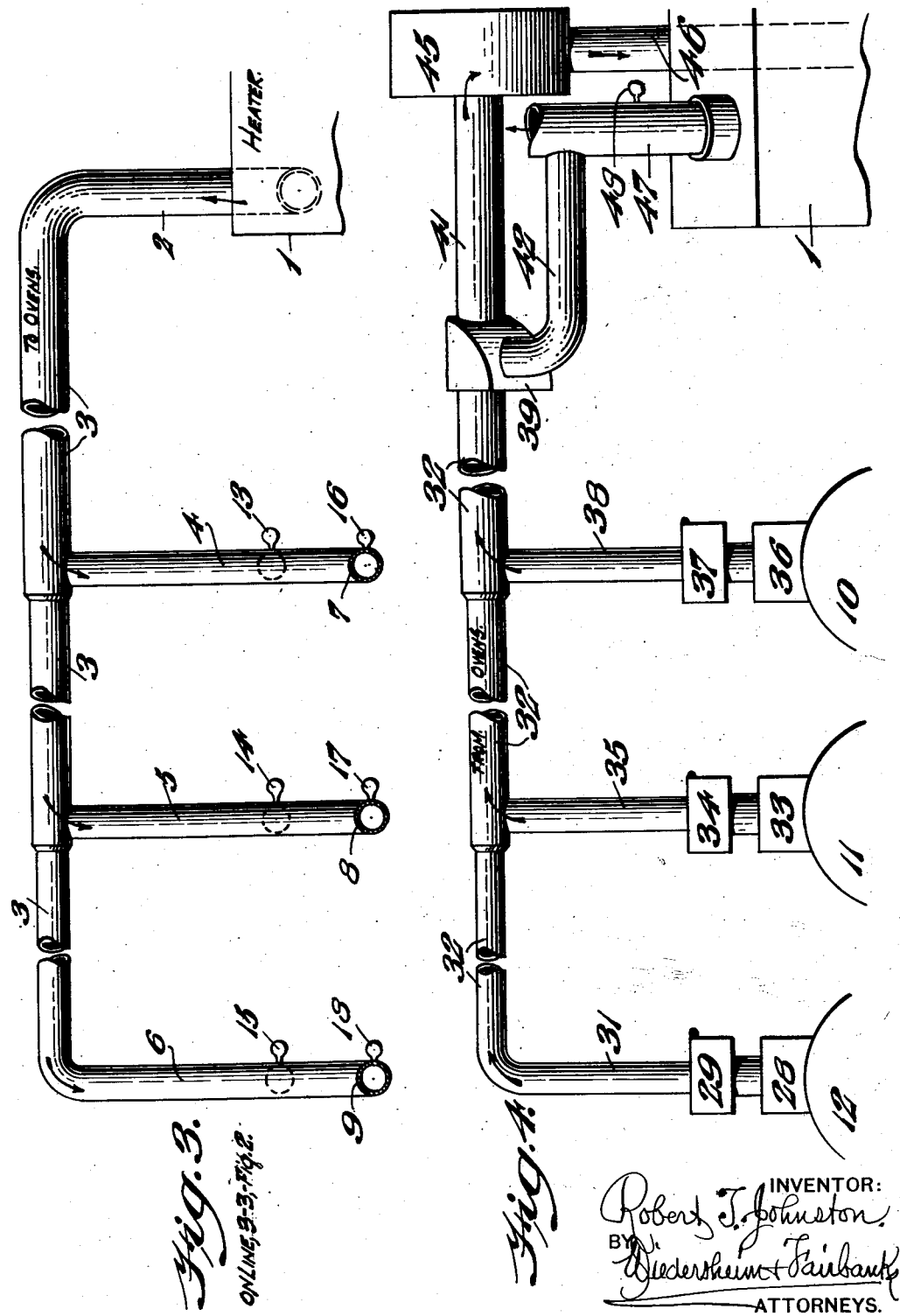

1,547,655

UNITED STATES PATENT OFFICE.

ROBERT T. JOHNSTON, OF NEW BRUNSWICK, NEW JERSEY, ASSIGNOR TO THOMAS HAZELTON, OF EAST ORANGE, NEW JERSEY, AND HARRY C. HOCHSTADTER, OF PHILADELPHIA, PENNSYLVANIA.

ROASTER FOR COFFEE, PEANUTS, ETC.

Application filed August 15, 1922. Serial No. 581,955.

*To all whom it may concern:*

Be it known that I, ROBERT T. JOHNSTON, a citizen of the United States, residing at New Brunswick, county of Middlesex, State of New Jersey, have invented a new and useful Roaster for Coffee, Peanuts, Etc., of which the following is a specification.

In the present methods, commonly in vogue in roasting a material such as coffee the coffee beans are roasted by the application thereto of direct heat in which the fumes and gases of combustion envelop the coffee to a greater or less extent during the entire period of dehydration and roasting.

Also in the present commercial methods commonly in vogue, gas is largely used and the flame is blown directly against the coffee as with a blow torch, the coffee being flowed past the flame by the action of the rotary conveyor of the roasting machine and receiving an application of flame to each revolution of the cylinder.

By the action of the flame and the constant envelopment of the coffee in the fumes or gases of combustion, there is a tendency to burn out and destroy the valuable oils of the coffee, which are depended upon to give it the desired aroma and preserve it from rapid deterioration after roasting.

In the aforesaid commercial methods in vogue, the deleterious action of the fumes and gases of combustion have in some instances proved so destructive that it has necessitated the abandonment of the direct flame method, since the envelopment of the coffee in these fumes and products of combustion during the entire roasting operation has caused chemical changes in the delicate oils, which are depended upon to furnish the aroma of the coffee.

By my novel invention, which I have devised for the purpose of overcoming the aforesaid objectionable features, I provide means for dehydrating and roasting all the coffee through the medium of pure heated air heated indirectly and entirely free from the burnt products of combustion, this pure heated air being generated in a separate furnace and forced into the coffee roasting chamber through a manifold at high velocity, which is so arranged and proportioned as to circulate the heated air systematically and rapidly through the roasting chamber in order that the air will absorb the greatest possible quantity of moisture in the process of dehydration and surround the coffee uniformly in the final process of roasting.

By my invention, the rotary conveyor of the roasting machine keeps the coffee in constant motion, lifting and flowing it back through the circulating heating medium, and the constantly uniform action of the heated air on the coffee dries and roasts it uniformly and rapidly with a minimum heat, and in this way the coffee is processed with the least possible loss of values.

I have further found that the uniformity of the roasting by my novel process is very noticeable, and this results from the systematic distribution of heated air through the batch of coffee which is constantly surrounded by the pure circulating heated heating medium, the results of my novel process resulting in a decreased shrinkage, a superior aroma of the coffee and in enhancing the preservation and keeping qualities of the coffee after roasting.

I have found from the practical use of my invention that the shrinkage loss is reduced from two to three per cent, since the roasting operation cannot take place until dehydration is complete, and this decreased percentage of shrinkage therefore represents the actual saving of the oils of the coffee, and coffee roasted by my novel process, by reason of the retention of the oils therein, will keep for several months without noticeable deterioration.

To the above ends my invention consists of a novel process and apparatus for roasting coffee, the novel features of which will be hereinafter fully set forth and pointed out in the claims.

It further consists of other novel features of construction, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of a coffee roaster, embodying my invention.

Figure 2 represents a plan view of Figure 1.

Figure 3 represents a diagrammatic sectional view of the inlet piping and its adjuncts, whereby the heating medium is conveyed from its source to the roasting appliances, the section being taken on line 3—3 Figure 2.

Figure 4 represents a diagrammatic view of the exhaust piping and its adjuncts, whereby the heating medium is withdrawn or exhausted from the roasting appliances to the desired points.

Figure 5 represents a section of one of the roasters on line 5—5 Figure 2.

Figure 6 represents on an enlarged scale a section on line 6—6 Figure 1.

Similar numerals of reference indicate corresponding parts.

In carrying out my invention, I employ a suitable furnace 1, which can be placed in any convenient point and piped to a group of any number of roasters. The furnace is preferably built on the unit system so that sections can be added as additional roasters are installed, and any suitable form of furnace and any suitable heating medium or fuel, as oil, gas, coal, coke or the like can be employed and any automatic or suitable form of heat regulation can be employed, which is maintained at a fixed temperature, regardless of the number of roasters in operation at one time.

As it will be apparent that any suitable form of furnace for heating the air used in the roasting operation may be employed, I have not undertaken to show or describe the same in detail, but have merely shown such a furnace diagrammatically at the right hand portion of Figure 1.

The pure highly heated air having been created in the furnace is withdrawn therefrom through the pipe 2, which leads to the main 3 from which lead vertical branches 4, 5 and 6, see Fig. 3, which lead to the horizontal branches 7, 8 and 9, the latter leading to the manifolds 26 in the coffee roasters 10, 11 and 12 respectively (see Fig. 2). Within the vertical branches 4, 5 and 6 are located the valves or dampers serving as hot air regulators as indicated at 13, 14 and 15. While I have shown but three of the roasters, it will be evident that their number may be increased or diminished according to requirement.

The horizontal branch 7 is provided with a rearward extension in which is the valve or damper 16 which serves as a cold air regulator for checking the respective roasts.

The horizontal branch 8 is provided with a similar rear extension having the valve or damper 17 for the same purpose and the rear extension of the horizontal branch 9 is provided with a similar valve or damper 18, and in proximity to the outer end of said horizontal branches are located the vapor nozzles 19, 20 and 21 respectively. The construction of the coffee roasters 10, 11 and 12 and their agitators may be of any suitable or conventional type such as seen in Patents 1,128,101 and 1,313,020, and in Figure 5 I have shown one conventional form of such roaster, which may be employed, wherein the coffee agitator or drum 22 is perforated and provided with the spiral blades 23, said barrel being rotated by any suitable means as the driven pinion 24 meshing with the gear 25. The manifold 26 which enters the barrel 22 is constructed in cross section as seen dotted in Figure 1 and is provided with perforations 27, so that the pure heated air entering said manifolds 26 from a branch (see Fig. 5) as 9 is caused to impinge directly upon the batch of coffee being processed.

From the top of each roaster as 12 extends the connection 28, which leads to the box 29 provided with the screens 30 serving as a chaff and dust separator from which leads the branch 31 to the main exhaust pipe 32. In like manner, from the roaster 11 leads the branch 33 to the box 34, which is provided with screens similar to those seen in Figure 5 and already described, from which leads the branch 35 to the main exhaust pipe 32.

In like manner, from the roaster 10 leads the branch 36 to the box 37, which is also provided with the screens similar to those seen in Figure 5, from which leads the pipe or branch 38 to the main exhaust pipe 32. The pipe 32 leads to the chamber 39, which has a gate 40 therein, which controls the outlet pipes 41 and 42, said gate 40 being operated from the exterior by the handle 43. The chamber 39 with its gate 40 forms a regulator for reconditioning the air and is provided with a fresh air intake 44 communicating with the atmosphere.

The branch 41 leads directly to the blower 45, which is connected to the furnace 1 by the pipe 46. The branch 42 leads to the stack 47, which is provided with the damper 48, the products of combustion from the furnace being discharged through said stack.

When the gate 40 is in the position seen dotted in Fig. 6, the air from the ovens is directed through the pipe 42 into the stack, and fresh air only is passed through the heater. When the gate is in the position seen in full lines in Figure 6 the greater portion of the air from the ovens is reconditioned, and only a small portion of fresh air is used, as is evident.

The operation is as follows:—

The pure highly heated air having been generated in the proper compartment of the furnace, passes therefrom through the pipe 2, main 3, and vertical branches 4, 5 and 6, best seen in Fig. 3, into the horizontal branches 7, 8 and 9, into the communicating manifolds as 26, and passing through the ports 27 (see Fig. 5) at a high velocity impinges on the coffee as it is agitated in the drum 22, it being apparent that only pure heated air entirely free from the burnt products of combustion is utilized in my novel process. Each of the manifolds 26 is arranged and proportioned so as to circulate the pure heated air systematically and rapidly throughout the drum or roasting chamber 22, so that said air will rapidly absorb the greatest possible quantity of moisture in the process of dehydration and surround the coffee uniformly in the final process of roasting, the rotary conveyor or drum 22 keeping the coffee in constant motion and lifting and blowing it back through the pure, heated circulating air, whereby the coffee is dried and roasted uniformly and rapidly, with a minimum heat and is consequently processed with the least possible loss of values.

The coffee being constantly surrounded by the circulating heated air, which is systematically distributed through the batch results in a very noticeable uniformity of the roast, a decreased shrinkage, a superior aroma, and the preservation or keeping qualities of the coffee after roasting.

By my process the shrinkage loss is reduced from two to three per cent, and as it is evident that the roasting operation cannot take place until dehydration is complete, this decreased percentage of shrinkage therefore represents the actual saving of the oils of the coffee The dampers 13, 14 and 15 best seen in Fig. 3, serve as hot air regulators for the vertical pipes and the dampers 16, 17 and 18, best seen in Fig. 2, serve as cold air regulators for checking the roasts, and can also be used to completely cool the roasts when desired.

Accurate heat control is an essential requirement of a commercial coffee roasting apparatus and in my device the regulation of the heat is under the instant control of the operator and ranges from the highest temperature required for roasting to cool atmospheric air, drawn in past the dampers 16, 17 and 18 to each roaster to check the roast as may be desired.

The practice of applying sufficient water to a freshly roasted batch to balance atmosphere conditions is followed in many roasting plants, and water can be applied in my process in atomized form by drawing it into the roasting chamber through the spraying nozzles or atomizers, 19, 20, or 21, simultaneously with the ingress of the cool atmospheric air controlled by the dampers 16, 17 and 18.

The nozzles or atomizers, 19, 20 and 21 may be of any conventional or standard construction, which it is unnecessary to describe in detail and may be provided with valves as 49 as will be understood from Fig. 5.

It will be evident that in any system of dehydration and treating materials with heated air, that in practice it will be impossible to utilize all of the heat in the air before exhausting it into the atmosphere, for which reason I have found it more economical to recondition a portion of this heated air by again passing it through the heating coils.

I found from practical experiments that it was essential to separate the chaff and dust from the air exhausted or withdrawn from the roasters through the pipes 31, 35, 38 and 32 (see Fig. 4) since when the chaff and dust was returned to the heating elements in the heater 1, the high temperature therein, burned the chaff and the heated air with which the coffee was roasted was fouled with the smoke of combustion.

I accordingly devised the separators 29, 34 and 37, whose internal construction will be apparent from Figure 5, and whose function is to remove the dust and chaff from the air before it is returned to the blower through the exhaust main 32. By the manipulation of the gate 40, which has already been explained, the exhaust or used heated air can be withdrawn from the roasters and conducted either in whole or in part to the stack 47 or to the blower 45, as is evident, the reconditioned air being conducted from the pipe 46 to the pipe 2 by any suitable means, which it is unnecessary to describe in detail.

It will be apparent that in my invention the pure heated air is generated in a separate furnace and piped to the roasting machines so that one furnace can be placed at any convenient point and piped to a group of any number of roasters, and the furnace being built on the unit system, additional sections can be added as additional roasters are installed, which is a great advantage over the present method of direct fires, where each roaster must necessarily embody its own furnace, with all the inconvenience and wastefulness of individual fires. It will further be apparent that my novel process is adaptable to all constructions of roasting machine of any of the standard or conventional types now in use, as it utilizes only about one half the blower and motor equipment used with standard machines, and requires only a separate heating furnace and a distributing manifold for each roaster, and the piping, stack and the like in use with the present standard machines can also be utilized in the installation of my novel process and apparatus.

Having thus described my invention what I claim as new and desire to secure by Letters Patent, is:—

1. The herein described method of roasting material, which consists in heating pure air, next directing the pure heated air unmixed with any products of combustion upon the batch of material to be roasted, and lastly checking the roast by an admixture of atmospheric air with said pure heated air.

2. The herein described method of roasting a material, which consists in heating pure air, next directing the pure heated air unmixed with any products of combustion upon the batch of material to be roasted, and, lastly, introducing into said heated air, an admixture of vapor and atmospheric air.

3. The herein described method of roasting a material, which consists in heating pure air, conducting the pure heated air to the batch of material to be roasted, maintaining said material in a state of agitation during the roasting operation, separating the chaff and dust from the heated air subsequent to its utilization in the roasting operation, and lastly, exhausting the heated air after purification to a stack or furnace.

4. The herein described method of roasting a material, which consists in heating pure air, conducting the pure heated air to the batch of material to be roasted, maintaining said material in a state of agitation during the roasting operation, commingling vapor and atmospheric air with said heated air, separating the impurities from said heated air subsequent to its utilization in the roasting operation, and lastly, exhausting the heated air after purification to the atmosphere or to a furnace for reheating it.

5. The herein described method of roasting a material, which consists in heating pure air, conducting the pure heated air to the batch of coffee to be roasted, maintaining said material in a state of agitation during the roasting operation, commingling vapor and atmospheric air with said heated air, separating the impurities from said heated air subsequent to its utilization in the roasting operation, exhausting the purified heated air partly into a stack and reheating device, and, lastly, commingling fresh air with said purified air prior to its introduction into said stack and reheating device.

6. In a roasting device of the character stated, means for heating pure air, means for agitating the material to be roasted, a manifold having ports therein in proximity to which the coffee is maintained in a state of agitation, and means for conducting the pure heated air into said manifold from which it is discharged upon said material.

7. In a device of the character stated, means for heating pure air, means for agitating the coffee to be roasted, a manifold having ports therein in proximity to which the material is maintained in a state of agitation, and means for conducting the pure heated air into said manifold from which it is discharged upon said material, in combination wtih means for commingling atmospheric air with said heated air prior to the impingement of the latter upon the material.

8. In a device of the character stated, means for heating pure air, means for agitating the material to be roasted, a manifold having ports therein in proximity to which the material is maintained in a state of agitation, and means for conducting the pure heated air into said manifold from which it is discharged upon said material, in combination with means for commingling atmospheric air and vapor with said heated air prior to the impingement of the latter upon the coffee.

9. The combination of a material roaster having therein means for agitating material, air heating means, an apertured manifold for discharging the superheated air unmixed with products of combustion into said material, an exhaust pipe leading from said roaster, a separator in said exhaust pipe, and an exhaust fan connected with said exhaust pipe.

10. The combination of a material roaster having therein means for agitating material, air heating means, an apertured manifold for discharging the heated air unmixed with products of combustion into and around said material while in a state of agitation, an exhaust pipe leading from said roaster, a separator in said exhaust pipe, an exhaust fan, a furnace having a stack, a chamber in said exhaust pipe having a gate therein, and connections controlled by said gate from said chamber to said fan and stack.

11. The combination of a material roaster having therein means for agitating coffee, air heating means, an apertured manifold for discharging the heated air unmixed with products of combustion into and around said material while in a state of agitation, an exhaust pipe leading from said roaster, a separator in said exhaust pipe, an exhaust fan, a furnace having a stack, a chamber in said exhaust pipe having a gate therein, and connections controlled by said gate from said chamber to said fan and stack, in combination with a fresh air intake opening leading into said chamber.

12. The combination of a material roaster having therein means for agitating the material, air heating means, an apertured manifold for discharging the heated air unmixed with products of combustion into and around said coffee while in a state of agitation, an exhaust pipe leading from said roaster, a separator in said exhaust pipe, an exhaust fan, a furnace having a stack, a chamber in said exhaust pipe having a gate therein, and connections controlled by said gate from said chamber to said fan and stack, in combination with a fresh air intake opening leading into said chamber, and a pipe leading from said fan to said furnace.

ROBERT T. JOHNSTON.

Witnesses:
ELIZABETH H. HARDING,
M. T. HARDING.